United States Patent
Vertegaal et al.

(10) Patent No.: US 12,153,727 B1
(45) Date of Patent: Nov. 26, 2024

(54) METHODS AND DEVICES FOR A TRANSPARENT TOUCH INPUT FOR INTERACTION WITH VIRTUAL OBJECTS IN XR ENVIRONMENTS

(71) Applicants: Roeland Petrus Hubertus Vertegaal, Perth Road Village (CA); Hemant Surale, Toronto (CA)

(72) Inventors: Roeland Petrus Hubertus Vertegaal, Perth Road Village (CA); Hemant Surale, Toronto (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/345,668

(22) Filed: Jun. 30, 2023

(51) Int. Cl.
*G06F 3/01* (2006.01)
*G06F 3/0346* (2013.01)
*G06F 3/042* (2006.01)
*G06F 3/044* (2006.01)

(52) U.S. Cl.
CPC .............. *G06F 3/011* (2013.01); *G06F 3/016* (2013.01); *G06F 3/0346* (2013.01); *G06F 3/0425* (2013.01); *G06F 3/0445* (2019.05)

(58) Field of Classification Search
CPC ......... G06F 3/011; G06F 3/0446; G06F 3/016
USPC ................................................ 345/173–175
See application file for complete search history.

(56) References Cited

U.S. PATENT DOCUMENTS

| | | | |
|---|---|---|---|
| 9,733,790 B2 * | 8/2017 | Sumner ................. | G06F 3/0346 |
| 11,373,271 B1 * | 6/2022 | Da Silva Quelhas .... | G06T 7/50 |
| 2017/0140552 A1 * | 5/2017 | Woo ...................... | G06F 3/0304 |
| 2023/0273985 A1 * | 8/2023 | Suchan ................. | G06F 3/0482 |
| | | | 726/18 |

OTHER PUBLICATIONS

Jiang, Y., Zhang, C., Fu, H., Cannavò, A., Lamberti, F., Lau, H. Y., & Wang, W. (May 2021). HandPainter-3D Sketching in VR with Hand-based Physical Proxy. In Proceedings of the 2021 CHI Conference on Human Factors in Computing Systems (pp. 1-13).
Surale, H. B., Gupta, A., Hancock, M., & Vogel, D. (May 2019). Tabletinvr: Exploring the design space for using a multi-touch tablet in virtual reality. In Proceedings of the 2019 CHI Conference on Human Factors in Computing Systems (pp. 1-13).
(Continued)

*Primary Examiner* — Calvin C Ma

(57) ABSTRACT

In various examples, the present disclosure describes methods and systems for interacting with virtual objects in an XR environment. A handheld input device including a transparent portion is held by a user while engaged in the XR environment. Camera tracking information is received from an external camera tracking system for tracking a position of the user's hand, for example, through the transparent portion of the device, and a position and orientation of the handheld input device is determined based on the camera tracking information. Touch information representative of touch inputs on a touch sensitive surface of the handheld input device may also be received. In examples, the position of the handheld input device and the touch inputs may be fed into a computing system for controlling interactions with virtual objects in the XR environment.

20 Claims, 7 Drawing Sheets

(56) References Cited

OTHER PUBLICATIONS

Le, K. D., Zhu, K., & Fjeld, M. (Nov. 2017). MirrorTablet: exploring a low-cost mobile system for capturing unmediated hand gestures in remote collaboration. In Proceedings of the 16th International Conference on Mobile and Ubiquitous Multimedia (pp. 79-89).
Matulic, F., Ganeshan, A., Fujiwara, H., & Vogel, D. (May 2021). Phonetroller: Visual Representations of Fingers for Precise Touch Input with Mobile Phones in VR. In Proceedings of the 2021 CHI Conference on Human Factors in Computing Systems (pp. 1-13).
Biener, V., Schneider, D., Gesslein, T., Otte, A., Kuth, B., Kristensson, P. O., . . . & Grubert, J. (2020). Breaking the screen: Interaction across touchscreen boundaries in virtual reality for mobile knowledge workers. arXiv preprint arXiv:2008.04559.
Biener, V., Gesslein, T., Schneider, D., Kawala, F., Otte, A., Kristensson, P. O., . . . & Grubert, J. (2022). PoVRPoint: Authoring Presentations in Mobile Virtual Reality. arXiv preprint arXiv:2201.06337.
Tarun, A., Wang, P., Strohmeier, P., Girouard, A., Reilly, D. and Vertegaal, R., 2013. PaperTab: tablets as thin and flexible as paper. In CHI'13 Extended Abstracts on Human Factors in Computing Systems (pp. 2881-2882).

\* cited by examiner

METHODS AND DEVICES FOR A TRANSPARENT TOUCH INPUT FOR INTERACTION WITH VIRTUAL OBJECTS IN XR ENVIRONMENTS

FIELD

The present disclosure relates to virtual reality (VR) and augmented reality (AR) systems, and in particular, to a device and method for interacting with virtual objects in an XR environment.

BACKGROUND

Virtual Reality (VR) and Augmented Realty (AR) are recognized technologies associated with a variety of applications involving a computer-simulated environment, including computer rendered images presented to a user on a display. While VR represents a fully immersive simulated environment, AR overlays virtual elements in a real-world environment. Similar to AR, Mixed Reality (MR) represents a blend of the virtual and real world, however in MR a user may interact with both virtual and physical objects and environments. Interaction within either an AR, VR or MR environment may be referred to collectively as Extended Reality (XR).

In XR, virtual objects are spatially located in a virtual three-dimensional (3D) space surrounding the user as represented to the user through an XR display. Currently, user experience in XR environments is sub-optimal due to the lack of haptic feedback. Users typically interact with virtual objects (including user interface elements) by directly tapping onto them in mid-air or using a raycast selection with a controller, which can be inaccurate or lead to user fatigue. Further, the use of a raycast controller makes it difficult for users to hold objects in XR environment.

Accordingly, it would be useful to provide a method and device for improving user experience when interacting with virtual objects in an XR environment.

SUMMARY

In various examples, the present disclosure describes methods and devices for interacting with virtual objects in an XR environment. A handheld input device including a transparent portion is held by a user while engaged in the XR environment. Camera tracking information may be received from a camera tracking system for tracking a position of the user's hand, for example, through the transparent portion of the device and optionally, motion information may be received from a motion sensor for detecting movement of the handheld input device. In examples, a position of the handheld input device is determined based on the camera tracking information and optionally, based on the motion information. Touch information representative of touch inputs on a touch sensitive surface of the handheld input device may also be received. In examples, the position of the handheld input device and the touch information may be fed into a computing system for controlling interactions with virtual objects in the XR environment. The disclosed device may help to overcome challenges associated with user experience in an XR environment, for example, by addressing the lack of haptic feedback when interacting with virtual objects.

In the present disclosure, the term "XR" refers to "extended reality", an umbrella term referring to immersive technologies such as augmented reality (AR), virtual reality (VR), and mixed reality (MR). As used herein, XR refers to the presentation of a virtual 3D visual environment to a user through an XR display. An XR display is typically a stereoscopic display capable of simulating the effects of binocular vision in a 3D environment, but in some examples may be a monoscopic display such as a conventional 2D display screen capable of rendering 3D environments by projecting them onto two dimensions.

As used herein, the terms "virtual 3D space", "virtual environment", and "virtual 3D environment" or "XR environment" may be used interchangeably to mean a three-dimensional virtual space, containing virtual objects, generated by a computing device and visually presented to a user via an XR display. The virtual objects within the virtual environment are typically visually presented to the user so as to simulate viewing the object as though it were an actual physical object located at an actual physical distance from the user's point of view, with an orientation and relationship to other virtual and/or real objects that simulates the presence of the virtual object within a physical environment. In the case of VR, the user may be presented with a field of view that consists entirely of virtual objects within the virtual environment; in AR or MR, the user may be presented with a combination of the virtual objects of the virtual environment and real objects of the user's physical environment, with the virtual environment being "overlaid" over the physical environment such that the virtual objects appear to be present within the physical environment.

In various examples, the present disclosure provides the technical effect that incorporating touch inputs from a touch sensitive surface of a handheld input device during interaction with 2D virtual objects in an XR environment, provides precise input that is not currently possible with mid-air gestures or controllers.

In some examples, the present disclosure provides the technical advantage that the handheld input device provides a passive haptic feedback to users engaged in an XR environment.

In some examples, the present disclosure provides the technical advantage that existing camera-based tracking systems and computer vision technologies can be used to track a position and orientation of the handheld input device, for example, by tracking a position of a user's hand or a position of one or more hand landmarks, while a user is holding the input device. In some embodiments, a further advantage is provided by an embedded motion sensor (e.g., inertial measurement unit) which may help to stabilize the orientation.

In some aspects, the present disclosure describes a handheld input device for interacting with one or more virtual objects in an XR environment. The input device includes: a planar portion having a touch sensitive surface including a touch sensor configured to detect a touch input from a user; one or more processor devices; and one or more memories storing machine-executable instructions, which when executed by the one or more processor devices, cause the handheld input device to: obtain touch information corresponding to the detected touch input; and communicate the touch information to a computing system for controlling interactions with the one or more virtual objects within the XR environment. For example, the computing system may be configured to control interactions with the one or more virtual objects within the XR environment.

In an example of the preceding example aspect of the handheld input device, the handheld input device further includes: an actuator coupled to the handheld input device, the actuator for generating a haptic feedback to a user holding the handheld input device.

In an example of a preceding example aspect of the handheld input device, the handheld input device further includes: a handle for holding the input device, wherein the one or more processor devices and the one or more memories are disposed within the handle.

In an example of the preceding example aspect of the handheld input device, the handheld input device further includes: a power source, wherein the power source is disposed within the handle.

In an example of a preceding example aspect of the handheld input device, the handheld input device further includes: a motion sensor disposed within the handle, the motion sensor for detecting a position and an orientation of the handheld input device, wherein the one or more processor devices is further configured to execute the machine-executable instructions to cause the handheld input device to: obtain motion information corresponding to the position and the orientation of the handheld input device; and communicate the motion information to the computing system for controlling interactions with the virtual object within the XR environment.

In an example of a preceding example aspect of the handheld input device, wherein the planar portion of the handheld input device is substantially transparent.

In an example of a preceding example aspect of the handheld input device, wherein the computing system is disposed within a head mounted device.

In an example of a preceding example aspect of the handheld input device, the handheld input device further includes: a rigid frame coupled to the handle and bounding the touch sensitive surface; wherein the touch sensitive surface is configured as a transparent window within the frame.

In an example of the preceding example aspect of the handheld input device, the handheld input device further includes: one or more markers coupled to the frame for tracking the frame with an external camera tracking system.

In an example of a preceding example aspect of the handheld input device, wherein the touch sensitive surface includes a first touch sensitive surface on a first side of the planar portion and a second touch sensitive surface on a second side of the planar portion.

In some aspects, the present disclosure describes a computer implemented method for interacting with a virtual object in an XR environment using a handheld input device. The method includes: receiving, from an external camera tracking system, camera tracking information representative of a position of a user's hand that is holding the handheld input device; estimating a position and an orientation of the handheld input device based on the camera tracking information; receiving touch information corresponding to a detected touch input on a touch sensitive surface of the handheld input device; and sending the position and the orientation of the handheld input device and the touch information to a computing system for controlling interactions with the virtual object within the XR environment, the position of the handheld input device corresponding to a position of a virtual tablet device in the XR environment.

In an example of the preceding example aspect of the method, wherein the camera tracking information includes a tracked position of one or more hand landmarks of the user's hand and estimating the position and the orientation of the handheld input device based on the camera tracking information comprises: estimating the position and the orientation of the handheld input device based on the position of the one or more hand landmarks.

In an example of the preceding example aspect of the method, wherein at least one of the one or more hand landmarks is visible through a transparent portion of the handheld input device.

In an example of a preceding example aspect of the method, wherein the camera tracking information includes a tracked position of one or more markers coupled to the handheld input device and estimating the position and the orientation of the handheld input device comprises: estimating a position and orientation of the handheld input device based on the tracked position of the one or more markers.

In an example of a preceding example aspect of the method, wherein the virtual object is a 2D virtual object, the method further includes: prior to receiving the touch information: detecting a virtual collision between the virtual tablet device and a 3D virtual object in the XR environment, the 3D virtual object serving as a container for the 2D virtual object; and displaying the 2D virtual object in the XR environment, the 2D virtual object being positioned in the XR environment to overlay the virtual tablet device with effect that interaction, by the user, with the 2D object in the XR environment causes a touch input to be detected on the touch sensitive surface.

In an example of a preceding example aspect of the method, wherein the virtual object is a 3D virtual object, the method further comprising: prior to receiving the touch information: detecting a virtual collision between the virtual tablet device and the 3D virtual object in the XR environment, wherein the virtual collision is associated with a tapping action of the handheld input device on a physical object, the tapping action performed by the user holding the handheld input device, the tapping action generating a haptic feedback to the user, the virtual collision serving to select the 3D virtual object for interaction within the XR environment.

In an example of a preceding example aspect of the method, the method further includes: generating, using an actuator coupled to the handheld input device, a vibrotactile feedback.

In an example of a preceding example aspect of the method, the method further includes: receiving motion information corresponding to motion of the handheld input device; and estimating the position and the orientation of the handheld input device based on the camera tracking information and the motion information.

In an example of the preceding example aspect of the method, wherein estimating the position and the orientation of the handheld input device based on the camera tracking information and the motion information comprises: fusing the camera tracking information and the motion information to generate a fused information; and estimating the position and the orientation of the handheld input device based on the fused information.

In some aspects, the present disclosure describes a non-transitory computer-readable medium having machine-executable instructions stored thereon which, when executed by one or more processors of a computing system, cause the computing system to: receive, from an external camera tracking system, camera tracking information representative of a position of a user's hand that is holding the handheld input device; estimate a position and an orientation of the handheld input device based on the camera tracking information; receive touch information corresponding to a detected touch input on a touch sensitive surface of the handheld input device; and send the position of the handheld input device and the touch information to a computing system for controlling interactions with the virtual object within an XR environment, the position and the orientation of the handheld input device corresponding to a position and an orientation of a virtual tablet device in the XR environment.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DETAILED DESCRIPTION

Figure 1:
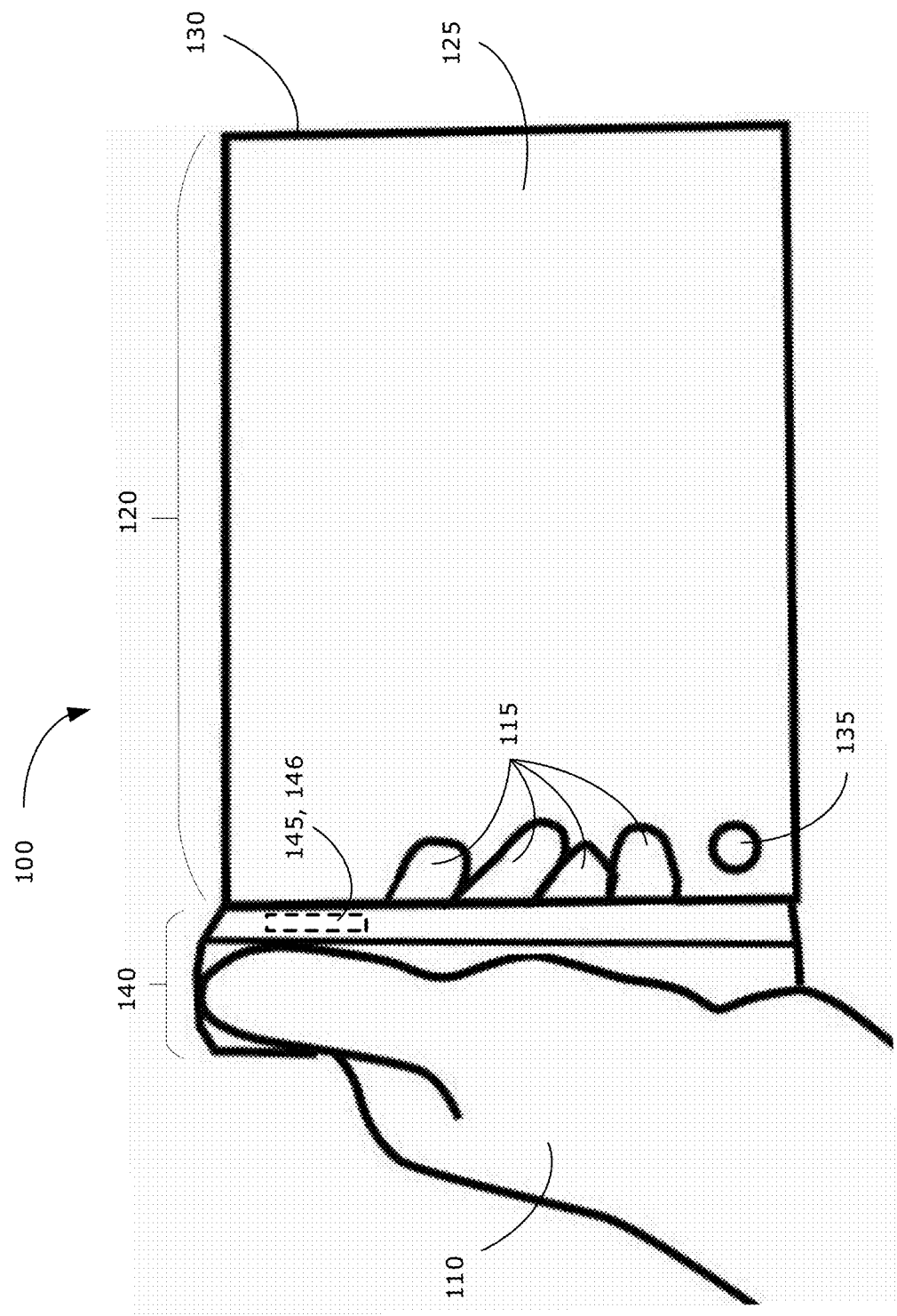
FIG. 1 is a front view of an example handheld input device for interacting with a virtual object in an XR environment, in accordance with examples of the present disclosure

The following describes example technical solutions of this disclosure with reference to accompanying figures. Similar reference numerals may have been used in different figures to denote similar components.

To assist in understanding the present disclosure, some existing techniques for interacting with virtual objects in an XR environment are now discussed. Common approaches for interacting with virtual objects (including user interface elements) rely on performing mid-air gestures or using ray cast selection via a traditional XR controller. Such interactions are inaccurate and challenging to perform due to the lack of haptic feedback, while repeated mid-air pointing or gestures can lead to fatigue. Further, the use of a controller makes it difficult to physically hold objects. As such, interactions with virtual objects in XR environments suffer due to the lack of physical surfaces, tools to organize information, and poor tactile or haptic feedback provided to the user. Approaches to address these issues have primarily used custom controllers to support interactions in XR environments. In some examples, external markers (for example, an active or passive infrared reflector to broadcast their position to a tracking base system) are applied to these custom controllers for tracking the position and orientation of the controllers in 3D space.

An example of a custom controller in the form of gloves worn by a user, is described in: Jiang, Ying, et al. "Handpainter-3d sketching in VR with hand-based physical proxy." Proceedings of the 2021 CHI Conference on Human Factors in Computing Systems. 2021, the entirety of which is hereby incorporated by reference. The approach presented in Jiang et al. (2021) introduced a glove worn in a user's non-dominant hand which can be used as a canvas proxy, while the index finger of the user's dominant hand is used as a 3D pen. However, such a system cannot provide vibrotactile feedback or multi-touch support; moreover, the smaller surface area of the non-dominant hand makes the drawing task challenging to perform.

Another example of a custom controller in the form of a conventional multi-touch tablet, is described in: Surale, Hemant Bhaskar, et al. "Tabletinvr: Exploring the design space for using a multi-touch tablet in virtual reality." Proceedings of the 2019 CHI Conference on Human Factors in Computing Systems. 2019, the entirety of which is hereby incorporated by reference. The approach presented in Surale et al. (2019) introduced an interaction vocabulary using a conventional multi-touch tablet in virtual reality for 3D modeling applications. However, due to the opacity of the tablet controller, the tablet position and orientation needs to be tracked using a custom tracker mounted on the tablet. Adding a custom tracker makes the apparatus bulky and difficult to operate.

Another example of a custom controller in the form of a mirror mounted on top of a conventional tablet, is described in: Le, Khanh-Duy, Kening Zhu, and Morten Fjeld. "MirrorTablet: exploring a low-cost mobile system for capturing unmediated hand gestures in remote collaboration." *Proceedings of the 16th International Conference on Mobile and Ubiquitous Multimedia.* 2017, the entirety of which is hereby incorporated by reference. The approach presented in Le et al. (2017) used the mirror mounted on top of the tablet to track the finger movement on the tablet; however, the tablet position or the orientation itself was not tracked. A similar mirror-based system for tracking user finger movement on a smartphone is described in Matulic, Fabrice, et al. "Phonetroller: Visual representations of fingers for precise touch input with mobile phones in VR." *Proceedings of the 2021 CHI Conference on Human Factors in Computing Systems.* 2021, the entirety of which is hereby incorporated by reference. The approach presented in Matulic et al. (2021) used a custom tracker to track the smartphone position and orientation in mid-air. However, both of the mirror-based approaches suffer from a bulky assembly hanging over the touch device, which limits and interferes with the use of the 2-dimensional interactive display.

Another example of a custom controller in the form of a multi-touch tablet in combination with virtual screens, is described in: Biener, Verena, et al. "Breaking the screen: Interaction across touchscreen boundaries in virtual reality for mobile knowledge workers." arXiv preprint arXiv: 2008.04559 (2020), the entirety of which is hereby incorporated by reference and Biener, Verena, et al. "Povrpoint: Authoring presentations in mobile virtual reality." *IEEE Transactions on Visualization and Computer Graphics* 28.5 (2022): 2069-2079, the entirety of which is hereby incorporated by reference. Like previously described examples, a custom tracker was used to track the tablet position in 3D space. Additionally, Biener et al. (2020), (2022) also use a complex camera-based motion tracking system (e.g., OptiTrack™) to track the tablet position and orientation. Motion tracking systems require multiple cameras surrounding a tracking zone (for example, mounted on the ceiling) to track desired objects, and the presence of physical markers can make the interactions cumbersome and challenging to perform while holding the tablet. Further, tracking hands behind a physical object like a tablet is currently not possible.

Finally, an example of an approach for organizing information using an electronic paper computer with flexible electrophoretic displays is described in: Tarun, Aneesh, et al. "PaperTab: tablets as thin and flexible as paper." *CHI'13 Extended Abstracts on Human Factors in Computing Systems*. 2013. 2881-2882, the entirety of which is hereby incorporated by reference. The approach presented in Tarun et al. (2013) provide a tactile-kinesthetic feedback during organization and interaction with digital information, however the approach is not configured for an XR environment.

The present disclosure describes examples that may help to address some or all of the above drawbacks of existing technologies.

FIG. 1 shows a front view of an example embodiment of a handheld input device 100 for interacting with a virtual object 15 in an environment 10, in accordance with examples of the present disclosure. In examples, the handheld input device 100 may be operatively coupled to a user 105, for example, the handheld input device 100 may be held in a user's hand 110. In examples, the handheld input device 100 may take the form of a tablet device, for example, having a planar portion 120 comprising a touch sensitive surface 125 configured to receive touch input from a user.

In some embodiments, for example, the planar portion 120 may include a rigid frame 130 bounding the touch sensitive surface 125. In some embodiments, for example, the touch sensitive surface 125 may be a capacitive touch sensitive surface, for example, a 2D capacitive touch screen including a capacitive touch sensor 122. In other embodiments, for example, the touch sensitive surface 125 may be a rigid panel, such as an acrylic panel or a glass panel installed with a capacitive touch sensor 122 on one or both sides of the rigid panel, to form one or two touch sensitive surfaces 125. In some embodiments, for example the capacitive touch sensor 122 and the touch sensitive surface may be transparent. In some embodiments, for example, the planar portion 120 may be coupled to a handle 140 for holding or gripping the handheld input device 100. In examples, the handle 140 may be configured to allow the user 105 to hold the handheld input device 100 in a variety of positions and orientations. In some embodiments, for example, planar portion 120 of the handheld input device 100 may be substantially transparent, such that when the handheld input device 100 is held in the user's hand 110, one or more fingers 115 of the user's hand 110 are visible through the transparent portion. In some embodiments, for example, the rigid frame 130 and/or the handle 140 may also be transparent, for example, formed of acrylic or another transparent material. In some embodiments, for example, the rigid frame 130 and/or handle 140 may be produced by 3D printing, or using another cost-effective manufacturing technique.

In some embodiments, for example, the handheld input device 100 is configured to be held in a user's non-dominant hand 110a such that the user's dominant hand 110b may engage with the touch sensitive surface 125 (for example, as described with respect to FIG. 4 below). In some embodiments, for example, the handheld input device 100 held in a user's non-dominant hand 110a allows for the user 105 to create a high fidelity 2D interaction space with passive force feedback and vibrotactile feedback. For example, the user 105 may hold the handheld input device 100 in any orientation and position around them as desired, with the rigid body of the handheld input device 100 providing passive force feedback to the user's hand 110. In some embodiments, for example, the handheld input device 100 may also include an embedded haptic motor 135 or vibrotactile actuator for providing vibrotactile feedback to the user's hand 110, while the user 105 is operating the handheld input device 100 in an environment 10.

In some embodiments, for example, an optional motion sensor 145 such as an inertial measurement unit (IMU) for detecting a position and/or orientation of the handheld input device 100, and a microprocessor device 136 configured to interface with a computing system 200 may be disposed within the handle 140. In examples, the motion sensor 145 may track movement of the handheld input device 100 in six degrees of freedom (6-DOF), including, for example, translational motion along the x, y, and z planes in a Cartesian coordinate system, as well as a rotation around the x, y, and z planes. In examples, the motion sensor 145 may detect motion information 530 which may be transmitted to the computing system 200 to be pre-processed or the motion information 530 may be pre-processed at the handheld input device 100 and pre-processed device movement information may be transmitted to the computing system 200. In examples, a power supply (e.g., batteries) and a communications interface for communicating wirelessly (e.g., Bluetooth, Wi-Fi, etc.) with the computing system 200 may also be housed within the handle 140. In some embodiments, for example, the handheld input device 100 may include other sensors, for example, configured for detecting a position of the handheld input device 100 including an ultra-wideband (UWB) sensor, among others. In other embodiments, one or more markers (not shown) may be fixed to the frame 130 or handle 140 of the handheld input device 100, for engaging with a camera-based tracking system 300, for example, a tracking system of a head mounted device (HMD) 150, or another camera-based tracking system configured to detect the position of the handheld input device 100.

Figure 2:
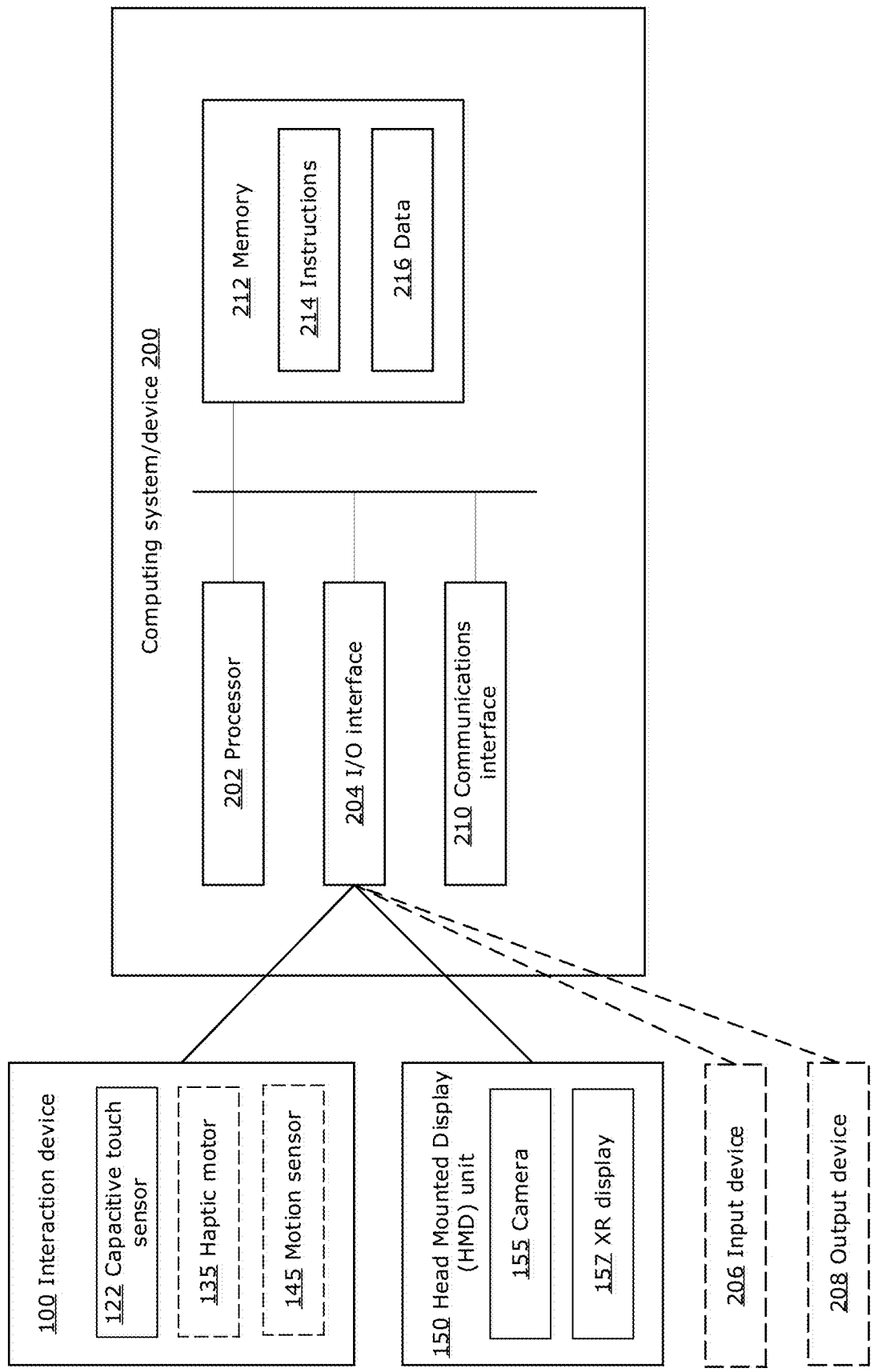
FIG. 2 is a block diagram of a computing system that may be used for implementing a hand state prediction system, in accordance with example embodiments of the present disclosure.

FIG. 2 shows a block diagram of an example hardware structure of a computing system 200 that is suitable for implementing embodiments of the system and methods of the present disclosure, described herein. Examples of the present disclosure may be implemented in other computing systems, which may include components different from those discussed below. The computing system 200 may be used to execute instructions to carry out examples of the methods described in the present disclosure.

Although FIG. 2 shows a single instance of each component, there may be multiple instances of each component in the computing system 200. Further, although the computing system 200 is illustrated as a single block, the computing system 200 may be a single physical machine or device (e.g., implemented as a single computing device, such as a single workstation, single end user device, single server, etc.). The computing system may be a mobile communications device (e.g. a smartphone), a laptop computer, a tablet, a desktop computer, a wearable device, a gaming device, a virtual reality device, an augmented reality device, an assistive technology device, among others. In some embodiments, the computing system 200 may comprise a plurality of physical machines or devices (e.g., implemented as a cluster of machines, server, or devices). In some embodiments, the computing system 200 may be a virtualized computing system (e.g., a virtual machine, a virtual server) emulated on a cluster of physical machines or by a cloud computing system.

The computing system 200 includes at least one processor 202, such as a central processing unit, a microprocessor, a digital signal processor, an application-specific integrated circuit (ASIC), a field-programmable gate array (FPGA), a dedicated logic circuitry, a dedicated artificial intelligence processor unit, a graphics processing unit (GPU), a tensor processing unit (TPU), a neural processing unit (NPU), a hardware accelerator, or combinations thereof.

The computing system 200 may include an input/output (I/O) interface 204, which may enable interfacing with the handheld input device 100 and a head mounted display (HMD) unit 150. In the example shown, the handheld input device 100 may include input from a capacitive touch sensor 122 and a motion sensor 145, among other sensors, and may provide output from a haptic motor 135. In the example shown, the motion sensor 145 and haptic motor 135 are shown as optional. In the example shown, the HMD unit 150 may include a camera 155 and a display screen 157 and/or other sensors, for example, a head mounted IMU (not shown). In examples, the camera 155 may be a visible light camera (e.g. red/green/blue (RGB) camera), or an infrared (IR) camera, among others. In examples, the I/O interface 204, may enable interfacing with an input device 206 (e.g., a keyboard, a mouse, a camera, a touchscreen, a stylus and/or a keypad) and/or an output device 208 (e.g., a display, a speaker and/or a printer). In the example shown, the input device 206 and output device 208 are shown as optional and external to the computing system 200.

The computing system 200 may include an optional communications interface 210 for wired or wireless communication with other computing systems (e.g., other computing systems in a network) or devices. The communications interface 210 may include wired links (e.g., Ethernet cable) and/or wireless links (e.g., one or more antennas) for intra-network and/or inter-network communications.

The computing system 200 may include one or more memories 212 (collectively referred to as "memory 212"), which may include a volatile or non-volatile memory (e.g., a flash memory, a random access memory (RAM), and/or a read-only memory (ROM)). The non-transitory memory 212 may store instructions 214 for execution by the processor 202, such as to carry out example embodiments of methods described in the present disclosure. For example, the memory 212 may store instructions 214 for implementing any of the systems and methods disclosed herein. The memory 212 may include other software instructions, such as for implementing an operating system (OS) and other applications/functions.

The memory 212 may also store other data 216, information, rules, policies, and machine-executable instructions described herein, including touch information 510 captured by the capacitive touch sensor 122, a hand image 520 captured by the camera 155, motion information 530 captured by the motion sensor 145 or data representative of a user's interaction with a virtual object captured by an input device on another computing system and communicated to the computing system 200.

In some examples, the computing system 200 may also include one or more electronic storage units (not shown), such as a solid state drive, a hard disk drive, a magnetic disk drive and/or an optical disk drive. In some examples, data and/or instructions may be provided by an external memory (e.g., an external drive in wired or wireless communication with the computing system 200) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. The storage units and/or external memory may be used in conjunction with memory 212 to implement data storage, retrieval, and caching functions of the computing system 200. The components of the computing system 200 may communicate with each other via a bus, for example.

Figure 3:
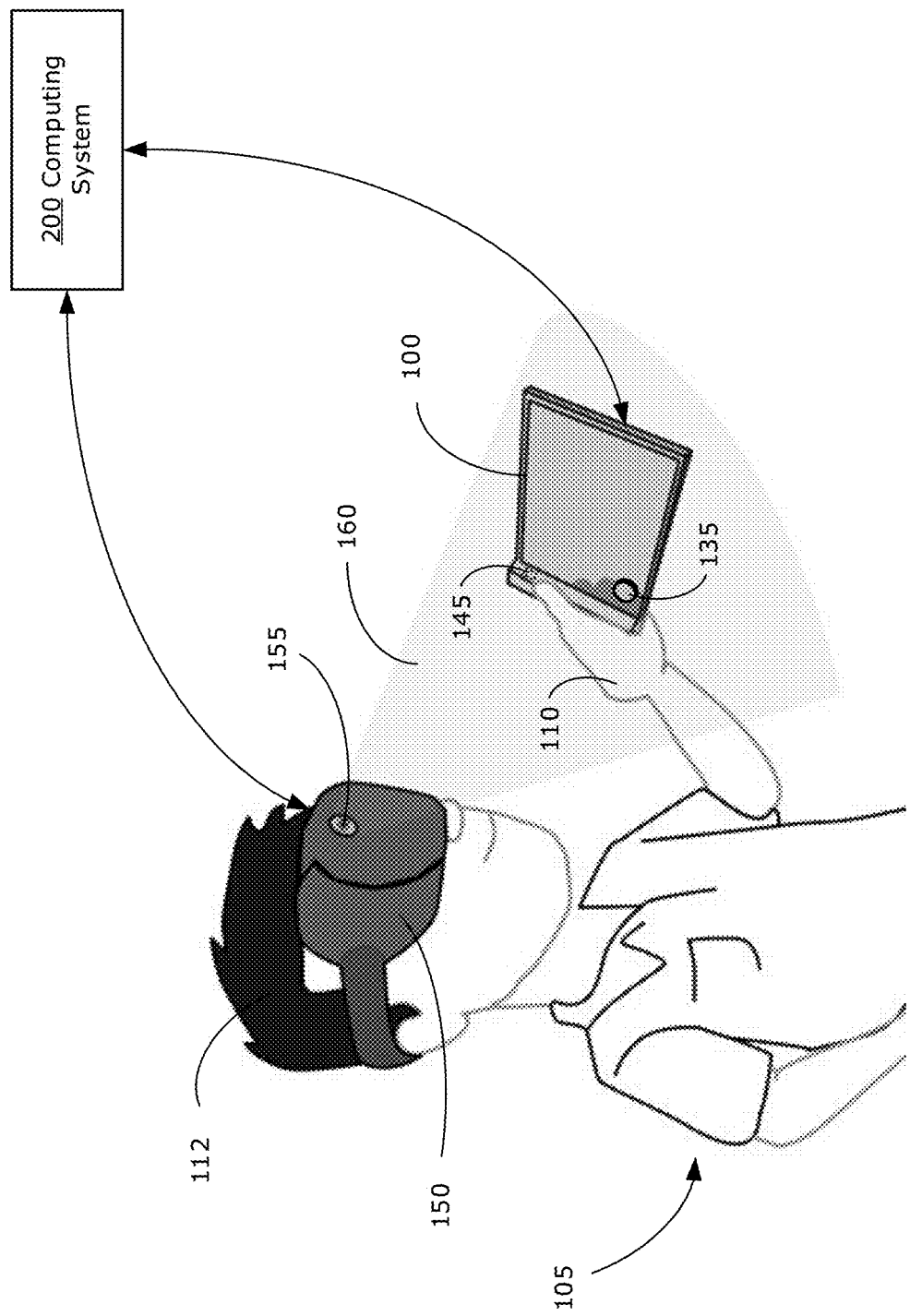
FIG. 3 shows an example of a user holding a handheld input device for interacting with a virtual object while engaged in an XR environment, in accordance with examples of the present disclosure.

FIG. 3 shows an example of a user 105 holding a handheld input device 100 for interacting with a virtual object while engaged in an environment 10, in accordance with examples of the present disclosure. In this simplified diagram, the handheld input device 100 is configured to interface with a computing system 200 in communication (e.g., via wired or wireless data connections such as 802.11 or Bluetooth™) with a head-mounted display (HMD) unit 150 worn on the user's head 112. In examples, the HMD unit 150 includes a camera 155 for capturing image frames including the user's hand(s) 110 and/or fingers 115 (e.g., hand image 520) within a field of view (FOV) 160 extending from the camera 155. In examples, a camera tracking system 300 (not shown) of the HMD 150 may determine a position of the user's hand 110 (e.g., camera tracking information 525) based on the image frames, and may communicate the camera tracking information 525 to the computing system 200. In examples, the HMD unit 150 also includes an XR display 157 (not shown) for presenting a virtual 3D environment to the user's eyes. In examples, while the HMD unit 150 is shown in FIG. 2 as having a specific form factor, it is understood that the HMD unit 150 may use any appropriate form, including, for example, eye glasses or a head-mounted helmet, among others.

In this example, the handheld input device 100 may include a motion sensor 145 (e.g., an IMU) configured to generate and communicate to the computing system 200, motion information 530. In examples, the motion information 530 may include a linear velocity and an angular velocity of the handheld input device 100, for example, as three dimensions of linear acceleration (x, y, z) detected by an accelerometer of the IMU and three dimensions of angular acceleration (roll, pitch, yaw) detected by a gyroscope of the IMU. In some embodiments, other sensors may be used to supplement the data from the IMU to provide better accuracy in tracking position and orientation of the handheld input device 100. In examples, the handheld input device 100 also includes a haptic motor 135 for generating vibrotactile feedback to the user's hand 110.

Figure 4:
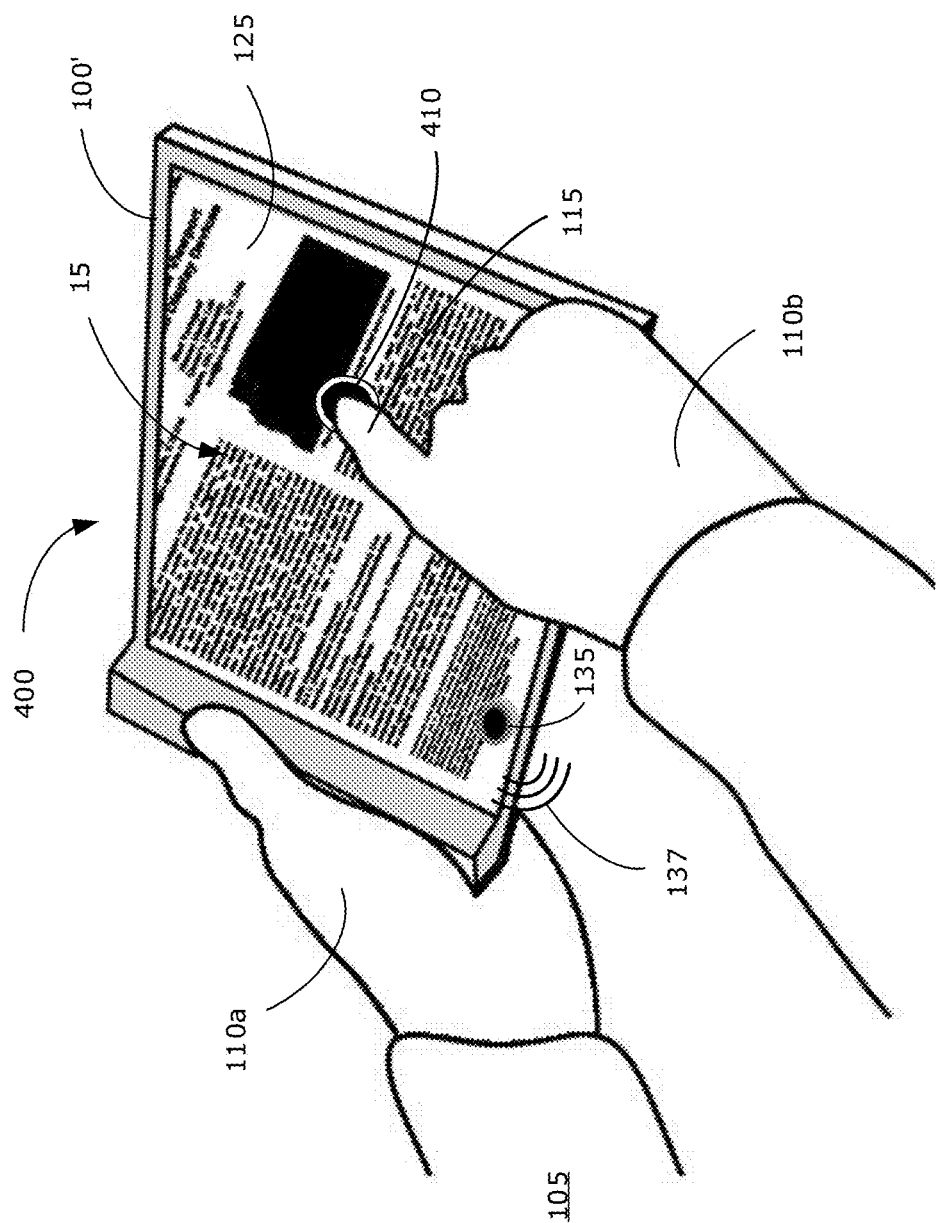
FIG. 4 shows an example of a touch event performed by a user holding a handheld input device while engaged in an XR environment, in accordance with examples of the present disclosure.

FIG. 4 shows an example of a touch event 400 performed by a user 105 holding a handheld input device 100 while engaged in an environment 10, in accordance with examples of the present disclosure. In examples, a user may be presented with an image of a virtual replica of the handheld input device 100 (hereinafter referred to as a virtual tablet device 610) in the environment 10, for example, presented on the XR display 157 of a HMD unit 150. In examples, within the environment 10, the user may be presented with a virtual object 15 on the virtual tablet device 610, for example, a virtual document or another type of virtual object. In examples, the user 105 may hold the handheld input device 100 in a non-dominant hand 110*a*, and in the process of interacting with the virtual object 15 presented to the user in the environment 10, the user 105 may engage the touch sensitive surface 125 of the handheld input device 100 in a touch event, for example, using a finger 115 of a dominant hand 110*b* or a non-dominant hand 110*a*, or alternatively, using a pointing device such as a stylus or a digital pen, among others. In some examples, holding the handheld input device 100, for example, holding the handle 140 of the handheld input device 100 in a non-dominant hand 110*a*, and contacting the touch sensitive surface 125 of the handheld input device 100, for example, with a dominant hand 110b, while engaged in an environment 10, may provide a passive force feedback to the user 105, for example, improving the user experience of interacting with the virtual object 15 in the environment 10.

In some examples, a user 105 may interact with the virtual object 15 through a touch interaction, for example, by performing a touch gesture on the touch sensitive surface 125. In examples, a touch gesture may activate a 2D capacitive touch sensor 122 embedded within the touch sensitive surface 125. For example, a capacitive touch screen draws small electrical charges to a point of contact by a user, and functions as a capacitor in the region of contact. In some examples, in response to a user's hand 100 or finger 115 placed in contact with the touch sensitive surface 125, a change in the capacitance and electrostatic field in the capacitive panel of the touch sensitive surface 125 provides location information corresponding to a touch position 410 on the touch sensitive surface 125. In examples, the touch position 410 may be described by a 2D coordinate (x,y) with respect to a local coordinate system of the handheld input device 100. In some embodiments, for example, the touch gesture may include a tap gesture, a swipe gesture or a pinch gesture, among others, where the touch gesture may involve contacting the touch sensitive surface 125 with one finger 115 or more than one finger 115 of the user's hand 110 and/or moving the one or more fingers 115 over the surface of the touch sensitive surface 125 over a period of time. In examples, a touch gesture may therefore be associated with a plurality of touch positions 410 on the touch sensitive surface 125, for example, provided as a 2D vector of touch points (x, y). In examples, a single touch location 410 or a plurality of touch locations 410 corresponding to an interaction event with a virtual object 15 on the handheld input device may hereinafter be referred to as touch information 510. While touch interactions with the handheld input device 100 are described with respect to one or more fingers 115 of a user in contact with the touch sensitive surface 125, it is understood that touch information 510 may be obtained using a digital pen or stylus, among others. In some examples, engaging with the handheld input device 100 provides a passive force feedback to the user 105 when the finger 115 or stylus device contacts the touch sensitive surface 125.

In some embodiments, for example, in response to engaging with the touch sensitive surface 125, the haptic motor 135 may generate a vibrotactile feedback as a vibration 137, which may be sensed by one or both hands 110 of the user 105. For example, moving the finger across a software object or another virtual object on the touch sensitive surface may cause a vibrotactile sensation on the surface of the tablet In some examples, the haptic motor 135 may also generate an audio feedback as a vibration sound which may be heard by the user 105.

Figure 5:
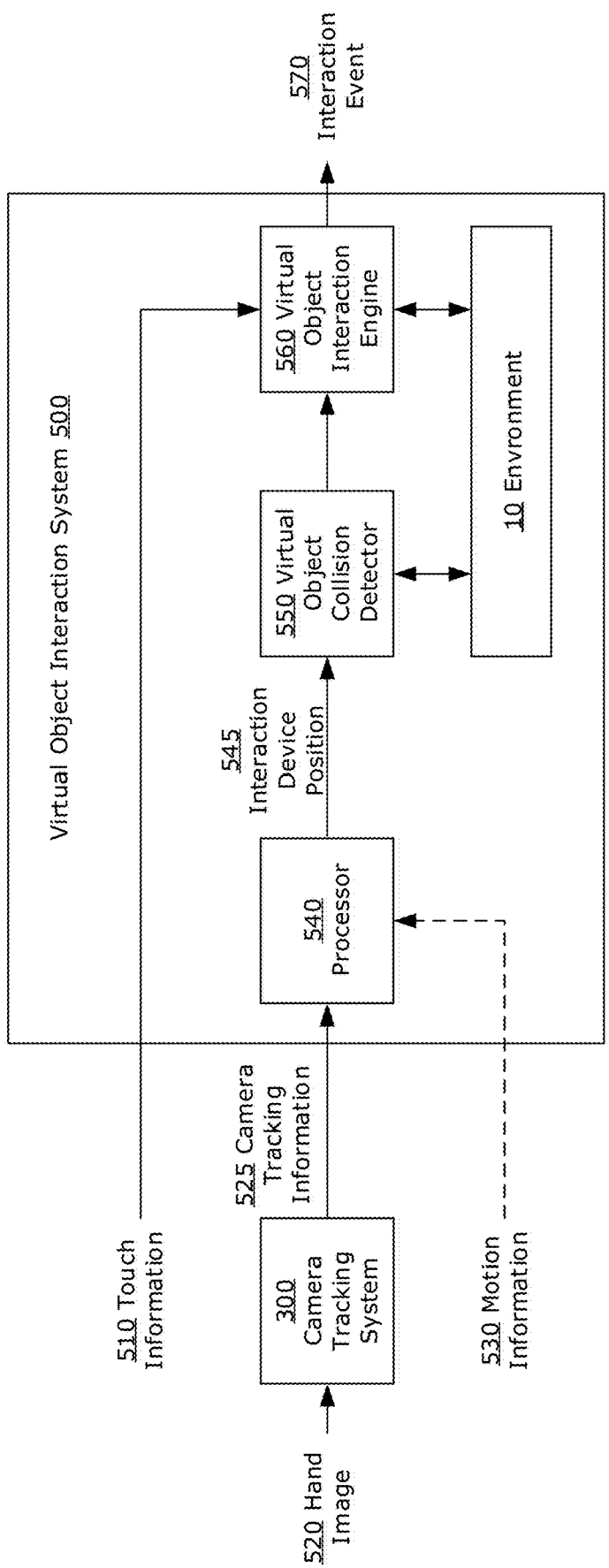
FIG. 5 is a block diagram illustrating a virtual object interaction system, in accordance with examples of the present disclosure.

FIG. 5 shows a block diagram of an example virtual object interaction system 500 of the present disclosure. The virtual object interaction system 500 may be a software that is implemented in the computing system 200 of FIG. 2, in which the processor 202 is configured to execute instructions of the virtual object interaction system 500 stored in the memory 212. The virtual object interaction system 500 includes a processor 540, a virtual object collision detector 550 and a virtual object interaction engine 560 and may interface with the environment 10. In examples, the virtual object interaction system 500 may also interface with an external camera-based positional tracking system 300 (e.g., on a head mounted display unit 150).

The virtual object interaction system 500 receives as input, a touch information 510 from a touch sensitive surface 125 of the handheld input device 100, a camera tracking information 525 from the camera tracking system 300 and optionally, motion information 530 from a motion sensor 145 on the handheld input device 100 and interfaces with an environment 10 to coordinate an interaction event 570 corresponding to a virtual object 15. Examples of interaction events may include scrolling a virtual document, editing a virtual document, selecting a menu item, transferring virtual documents between a selected virtual object 15 and the virtual tablet device 610, among others.

In some embodiments, for example, a camera tracking system 300 external to the virtual object interaction system 500 may continuously capture images of the user's hand(s) 110, (e.g., a hand image 520) using a camera 155. In examples, the camera tracking system 300 may process the hand image 520 using known computer vision techniques, to generate camera tracking information 525, for example, by tracking and estimating a 3D position of the hand 110 or hand landmarks, such as the forearm, wrist or one or more fingertips or finger joints of the hand 110 holding the handheld input device 100, among others. In examples, camera tracking information 525 may be received by the processor 540 of the virtual object interaction system 500 for determining the position of the handheld input device 100 in 3D space (e.g., handheld input device position 545). In this regard, the virtual object interaction system can benefit from hand tracking capabilities that may already be incorporated into the camera tracking system 300 of a HMD unit 150 for the purpose of tracking hand gestures in an environment 10, in order to track the position and/or orientation of the handheld input device 100 in 3D space.

In some embodiments, for example, one or more external markers (e.g., fiducial markers) may be fixed to the frame 130 or handle 140 of the handheld input device 100, for example, to designate the four corners of the handheld input device 100. In examples, the camera tracking system 300 may capture images of the handheld input device 100 including the markers, for tracking the position and orientation of the handheld input device 100. In examples, the position and orientation of the handheld input device 100 may be determined by fitting a 3D model of the handheld input device to the visible positions of the fiducial markers in the captured images, among others. In some examples, external markers may include an active or passive infrared reflector, among other types of markers and the camera 155 may be an IR camera for capturing IR images. In other embodiments, an infrared reflective filament may be incorporated into the frame 130 of the handheld input device 100 during fabrication, for example, for camera-based tracking using an IR camera and computer vision algorithms for estimating position and orientation of the handheld input device 100 based on the IR images, for example, by fitting a 3D model of the handheld input device to the to the fully or partially visible portion of the IR reflective frame 130, among others.

In some embodiments, for example, motion information 530 representative of a movement of the handheld input device 100 while the handheld input device 100 is held in the user's hand 110, may be received by the processor 540 of the virtual object interaction system 500, for example, for providing tilt and orientation of the handheld input device 100. In examples, camera-based tracking of hand position can be augmented by the motion data, for example, to help stabilize camera-based estimates of the position of the handheld input device 100.

In examples, the camera-tracked positions may be updated based on input from motion data at 90 frames per second to provide a smooth experience. In examples, the processor 540 may receive the camera-tracking information 525 and optionally, the motion information 530 and may process this information to generate the handheld input device position 545. For example, the camera tracking information 525 may provide a location of the wrist and/or fingertips (e.g., visible through the transparent handheld input device 100) of a user's hand 110 while holding the handheld input device 100, and the processor 540 may determine the position of the handheld input device 100 based on the position of the user's hand 100, for example, the center of the wrist may be used to infer the position of the handheld input device 100. Optionally, the processor 540 may also use the motion information 530 to stabilize the orientation of the handheld input device 100, or to stabilize or inform other aspects of the position information 545.

In some embodiments, for example, the processor 540 may fuse all or some of the received information, for example, using a sensor fusion algorithm. In examples, a sensor fusion algorithm may combine sensor data from different modes or sources into a single representation (e.g., fused information), and the processor 540 may use the fused information to generate the handheld input device position 545. In examples, fusing information from different sources may help to enhance correlated features and reduce uncertainty in a system. In some examples, the processor 540 may use a machine learning (ML) model to perform a primary task of estimating the handheld input device position 545, for example, where sensor fusion, for example, in the form of feature extraction and feature fusion, may be an auxiliary task of the ML model. In some examples, the fusion of representations from different modalities (for example, camera-tracking information 525 and motion information 530) into a single representation enables the ML model to learn a joint representation of each of the modalities, with a benefit that additional information may be extracted from the inertial motion modality that may not be present in the camera-tracking information 525.

In examples, the virtual object interaction system 500 may interface with the environment 10 to represent the handheld input device 100 within the environment 10 as a respective virtual object (e.g., virtual tablet device 610), for example, by mapping the handheld input device position 545 into the virtual space and rendering the virtual tablet device 610 on the XR display 157. In examples, the environment 10 may be modeled to resemble the physical 3D space of the user 105, for example, the environment 10 may be a virtual replica of the user's physical workspace and virtual objects 15 may include, for example, 3D virtual objects 15a (e.g., modeled as a 3D primitive object such as cube, sphere, cylinder, capsule, plane, or quad in the environment 10 to resemble physical objects in the physical workspace, such as a virtual display, keyboard, desk etc.) and 2D virtual objects 15b (e.g., a virtual document or file folder etc.), among others.

In examples, a common approach for selecting virtual objects 15 for interaction within an environment 10 involves raycasting, for example, using a handheld controller to aim a ray of light at a target virtual object 15 and performing a selection action (e.g., gesture, button click, voice command etc.) to select the virtual object 15. In some embodiments, for example, the present disclosure enables the selection of a virtual object 15 for interaction in an environment 10 by detecting a virtual collision 600 between the virtual tablet device 610 and a virtual object 15, rather than by raycasting.

In examples, a virtual collision 600 may occur when one or more virtual objects 15 in the environment 10 meet or intersect, for example, within a pre-defined collision zone, in the virtual environment. In examples, the handheld input device position 545 may be fed into a virtual object collision detector 550 for interfacing with the environment 10 and for determining any instances of virtual collisions between the virtual tablet device 610 and another virtual object 15.

In examples, a virtual collision 600 may be accompanied by a physical tapping action between the handheld input device 100 and a physical object in the physical workspace. The objects in the real world, in order to be touched, have a virtual correlate in the environment 10 that is the same size, shape and dimension. In examples, the movement of the handheld input device 100 to initiate a tapping action on the physical object may be tracked by the camera tracking system 300 and optionally, sensed by the motion sensor 145, and accordingly, a virtual collision 600 may be detected between the virtual tablet device 610 and a corresponding virtual object 15. In examples, the virtual object 15 that is selected as a result of the virtual collision 600 may be a 3D virtual object 15a that is a virtual of the physical object associated with the tapping action, for example, the physical object that is tapped may be a tray, a keyboard, a display etc., and the tapping action may cause a virtual collision 600 between the virtual tablet device 610 and a respective virtual tray, virtual keyboard, or virtual display etc. In some embodiments, the virtual tablet device 610 or a 3D virtual object 15a may act as a container for virtual documents, for example, images, videos, text, and UI components, among others. In examples, the virtual object 15 that is selected as a result of the virtual collision 600 may be a 2D virtual object 15b that is contained within the 3D virtual object 15.

In examples, tapping interactions offer haptic feedback when the handheld input device 100 makes contact with another physical object (e.g., as a passive force feedback applied to the frame 130 of the handheld input device 100) which can be sensed by the hand 110 holding the handheld input device 100. In some embodiments, for example, the handheld input device 100 may be configured to provide vibrotactile feedback by vibrating the haptic motor 135 when a virtual collision 600 is detected, or a vibrotacile feedback may be generated in response to another interaction.

In examples, in response to detecting a virtual object collision 600, information about the selected virtual object 15 may be fed into a virtual object interaction engine 560 for facilitating an interaction event 570 with the selected virtual object 15 using a touch sensitive surface of the handheld input device 100. In examples, the virtual object interaction engine 560 may be configured to interface with the environment 10 to facilitate the interaction event 570. Examples of interaction events may include scrolling a virtual document, editing a virtual document, selecting a menu item, transferring virtual documents between a selected virtual object 15 and the virtual tablet device 610, among others. An example approach for transferring virtual documents between virtual objects 15 in an environment 10 that can be implemented by the virtual object interaction engine 570 is described in: Tarun, A., Wang, P., Strohmeier, P., Girouard, A., Reilly, D. and Vertegaal, R., 2013, PaperTab: tablets as thin and flexible as paper, In CHI'13 Extended Abstracts on Human Factors in Computing Systems (pp. 2881-2882), the entirety of which is hereby incorporated by reference. In examples, virtual documents may be rendered in the environment 10 to be overlaid on top of the virtual tablet device 610, for example, based on the position information 545. For instance, tapping the handheld input device 100 on a physical tray having a respective virtual tray in the environment 10 containing 2D virtual objects 15b (e.g., virtual emails) may cause the 2D virtual object 15b to be selected and may cause the virtual tablet device 610 to "pick up" one of the emails for viewing or further interactions on the virtual tablet device 610 in the environment 10. In another example, tapping the handheld input device 100 on a physical keyboard may cause a virtual keyboard to be selected and enable text input from the physical keyboard in the recently "picked up" email on the virtual tablet device 610.

In examples, to facilitate the interaction event 570, the virtual object interaction engine 560 may also receive touch information 510 from the handheld input device 100. In examples, the touch information 510 may be representative of a touch gesture performed by the user 105 on the touch sensitive surface 125, for example, including a touch position 410 or a plurality of touch positions 410 as a 2D vector (x,y). For instance, capturing a touch input using a capacitive touch sensor 122 may provide greater accuracy in determining a position of a touch input than relying on estimates of a touch input position obtained using a camera-based tracking system 300.

Figure 6:
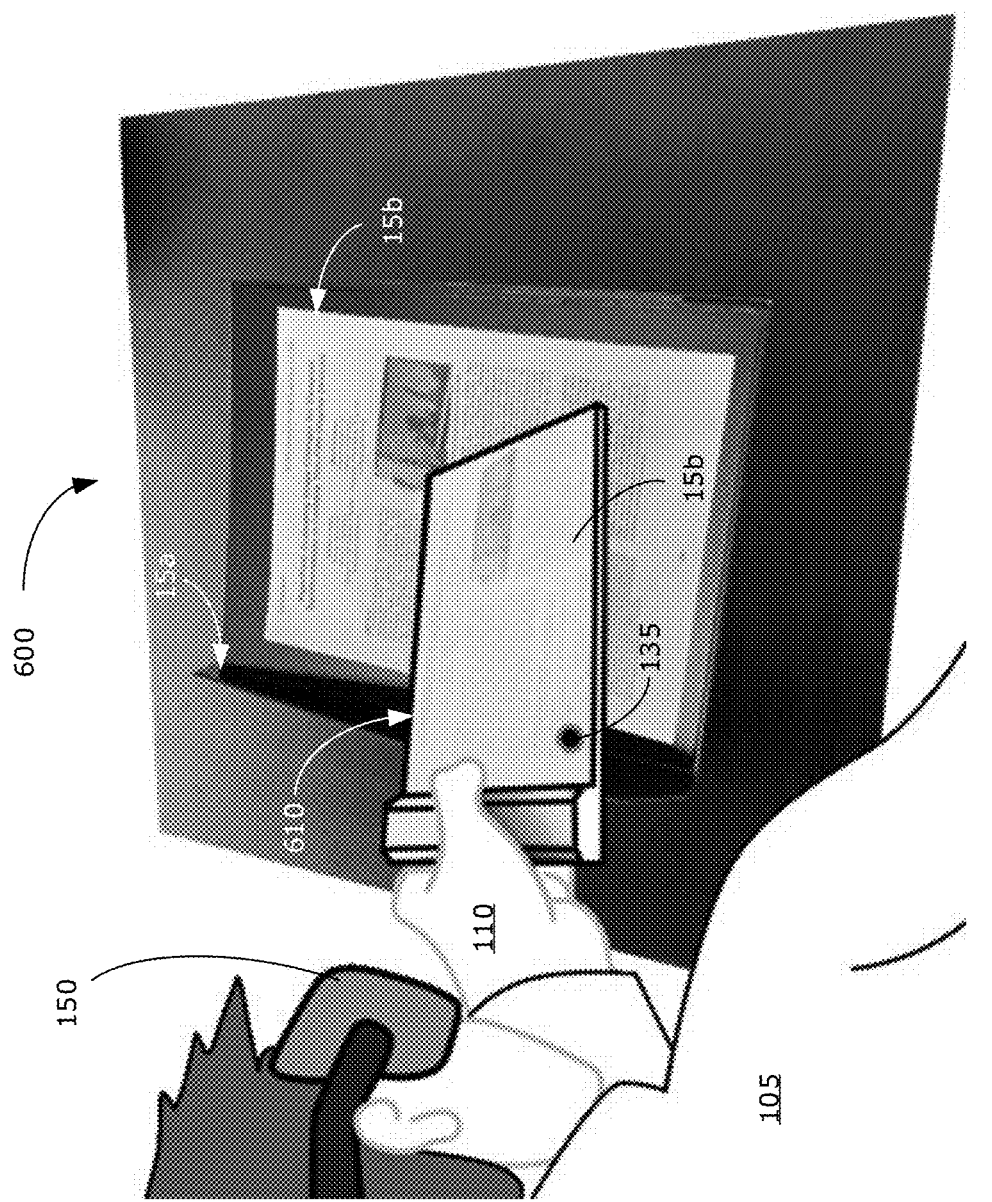
FIG. 6 shows an example of a virtual collision causing an interaction event, in accordance with examples of the present disclosure.

FIG. 6 shows an example of a virtual collision 600 causing an interaction event 570, in accordance with examples of the present disclosure. In examples, the user 105 may tap a corner of the handheld input device 100 on a physical tray, causing a virtual collision 600 to be detected between a respective 3D virtual object 15a (e.g. a virtual tray) and the virtual tablet device 610. In examples, the virtual tray may contain a 2D virtual object 15b (e.g., a virtual document) and the virtual collision 600 may transfer the virtual document from the virtual tray to the virtual tablet device 610 (e.g., cause the virtual document to be "picked up" by the virtual tablet device 610).

To demonstrate how the interaction device 100 may be used for interacting with one or more virtual objects 15 in an environment 10, an example use case for attaching a virtual document to an email reply is described. In examples, the one or more virtual objects 15 referenced in the example use case may include a first virtual object as a virtual document, a second virtual object as an electronic message (e.g., email) and a third virtual object as an email "reply" to the second virtual object. In examples, the environment 10 may comprise a virtual workspace including a virtual keyboard, a virtual display and a virtual tray containing a plurality of virtual emails, the virtual workplace being a virtual correlate of a physical workspace including a physical keyboard, a physical display and a physical tray. The use case begins, for example, when a user 105, wearing a HMD unit 150 and engaged in an environment 10 obtains a virtual document that is visible in the environment 10. In examples, the user 105 wearing the HMD unit 150 may engage with the physical keyboard in the physical workspace to type the virtual document while visualizing the text of the virtual document on the virtual display in the environment 10.

In examples, the user 105 may then tap the handheld input device 100 to the physical tray in the physical workspace, to cause a virtual collision 600 between the respective virtual tray and the virtual tablet device 610. In examples, the virtual tray may contain one or more virtual documents (e.g., emails) which may be visible in the environment 10 as a list of emails in the virtual tray, and the virtual collision 600 may cause one of the virtual emails to be selected (e.g., "picked up") by the virtual tablet device 610. For instance, the user 105 may direct a corner of the handheld input device 100 (e.g., top right corner) to a specific location on the physical tray, that corresponds to a specific one of the plurality of virtual emails in the virtual tray. In examples, in the environment 10, a virtual indicator may be visible on the corner of the virtual tablet device 610 to assist the user 105 in performing the tapping action. In some embodiments, for the example, the interaction event may be accompanied by an audio feedback (e.g., a sound may be generated when the email is "picked up") or in other examples the first interaction event may be accompanied a haptic or vibrotactile feedback. In examples, the selected email may be visible on a first surface of the virtual tablet device 610.

In examples, the user 105, while engaged in the environment 10, may then rotate the handheld input device 100 to view a second surface of the virtual tablet device 610 in the environment 10. In examples, the second surface of the virtual tablet device 610 may display an email client with a number of visible buttons or menu items (e.g., new, next, move to, delete, favorite and reply), providing options for interacting with the email. In examples, the user 105 may select the "reply" button by touching the touch sensitive surface 125 of the handheld input device 100 (e.g., using a finger 115 or a stylus device) at a position corresponding to the position of the "reply" button that is visible on the second surface of the virtual tablet device 610 in the environment 10. In examples, an indicator may appear in the environment 10 indicating a position of the user's finger 115 in the virtual space, for example, to assist the user 105 in selecting a desired option on the virtual tablet device 610. In some embodiments, for example, contacting the touch sensitive surface 125 may initiate an audio feedback or a vibrotactile feedback, for example, the handheld input device 100 may vibrate when the "reply" option is selected, causing a sound, and the user's hand 110 or finger 115 may sense the vibration. In examples, the email client may execute the "reply" instruction causing a new email to be generated for editing on the virtual tablet device 610.

In examples, in response to selecting the "reply" button, a new email may be generated by the email client for replying to the previously selected email. In examples, the user 105, while engaged in the environment 10, may then rotate the handheld input device 100 to view an email editor on the first surface of the virtual tablet device 610 in the environment 10 for composing a body of the "reply" email. In examples, the user 105 may tap the handheld input device 100 (e.g., the top right corner of the handheld input device 100) on a physical keyboard to select a corresponding virtual keyboard in the environment 10 and to connect the physical keyboard to the email editor. In examples, the user 105 may then type on the physical keyboard to enter text into the email editor for composing the body of the "reply" email.

In examples, the user may then attach the virtual document to the body of the "reply" email by tapping the handheld input device on a physical display in the physical workspace, to cause a virtual collision 600 between the respective virtual display and the virtual tablet device 610. In examples, the virtual display may act as a container that is holding the virtual document. In examples, the virtual document may be transferred to the email client and a document icon may be visible as an attachment in the "reply" email.

In examples, the user may send the "reply" email, including the attachment, to a recipient by tapping the handheld input device on the physical tray in the physical workspace, to cause a virtual collision 600 between the respective virtual tray and the virtual tablet device 610. For instance, the user 105 may direct a corner of the handheld input device 100 (e.g., top right corner) to a specific location on the physical tray, that corresponds to a specific one of the plurality of virtual emails visible in the virtual tray, for example, "send the email". In examples, a haptic or audio feedback may be generated by the handheld input device 100 when the email is sent.

Figure 7:
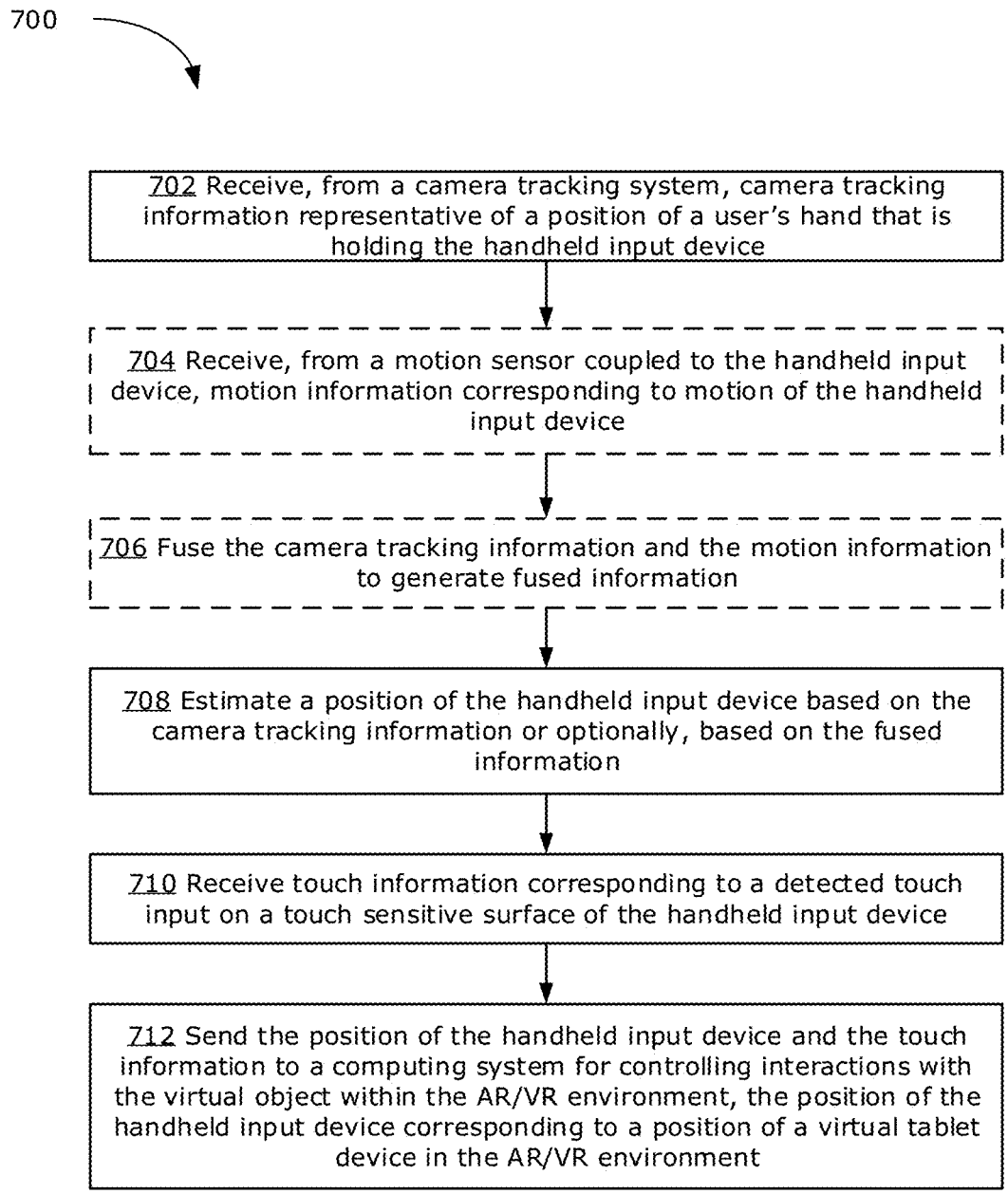
FIG. 7 is a flowchart illustrating an example method for interacting with a virtual object in an XR environment using a handheld input device, in accordance with examples of the present disclosure, in accordance with examples of the present disclosure.

FIG. 7 is a flowchart illustrating an example method 700 for interacting with a virtual object 15 in an environment 10 using a handheld input device (e.g., handheld input device 100), in accordance with examples of the present disclosure. The method 700 may be performed by the computing system 200. The method 700 represents operations performed by the virtual object interaction system 500 depicted in FIG. 5. For example, the processor 202 may execute computer readable instructions 214 (which may be stored in the memory 212) to cause the computing system 200 to perform the method 700.

Method 700 begins at step 702 in which camera tracking information 525 representative of a position of a user's hand 110 that is holding the handheld input device 100, is received from a camera-based tracking system 300.

Optionally, at step 704, motion information 530 corresponding to motion of the handheld input device 100 may be received from a motion sensor 145 coupled to the handheld input device 100. Optionally, at step 706, the camera tracking information 525 and the motion information 530 may be fused, for example, using a sensor fusion algorithm to generate fused information.

At step 708, the handheld input device position 545 may be estimated based on the camera tracking information 525. For example, the handheld input device position 545 may be estimated based on a position of the user's wrist as determined by the camera-based tracking system 300, or alternatively, based on another landmark of the user's hand or based on one or more markers coupled to the frame 130 of the handheld input device 100. In some embodiments, for example, when motion information 530 is received as in optional step 704, the handheld input device position 545 may be estimated based on the camera tracking information 525 and the motion information 530. In some embodiments, for example, when the camera tracking information 525 and the motion information 530 are be fused as in optional step 706, the handheld input device position 545 may be estimated based on the fused information.

At step 710, touch information 510 corresponding to a detected touch input on a touch sensitive surface 125 of the handheld input device 100 may be received. In examples, touch information 510 may be representative of a touch gesture performed by the user 105 on the touch sensitive surface 125, for example, including a touch position 410 or a plurality of touch positions 410 as a 2D vector (x,y). In examples, the touch sensitive surface may be a capacitive touch sensitive surface and the touch information may be received from a capacitive touch sensor 122. In examples, capturing a touch input using a capacitive touch sensor 122 may provide greater accuracy in determining a position of a touch input than relying on estimates of a touch input position obtained using a camera-based tracking system 300.

At step 712, the handheld input device position 545 and the touch information 510 may be sent to a computing system 200 configured to control interactions with the virtual object 15 within the environment 10. In some embodiments, for example, the handheld input device position 545 may be used to update a position of a virtual tablet device 610 in the environment 10, where the virtual tablet device 610 is a virtual correlate of the handheld input device 100 in the environment 10.

Although some examples have been described in the context of interacting with 2D virtual objects (e.g., documents, emails, etc.) it should be understood that examples of the present disclosure may be implemented for other applications. In some embodiments, for example, the present disclosure may include an organizing structure for 3D solid modeling tasks in a mixed-reality environment, for example, the handheld input device 100 may contain or facilitate interaction with 3D objects, 3D characters, animation sequences, slicing planes, extrusion planes, edges, vertices, planes, and the like. In examples, examples of the present disclosure may also move, copy, and reference the above described or other virtual objects from the organizing structure to other physical or virtual objects in the mixed-reality environment. Additionally, the user 105 may directly manipulate the above described or other virtual objects on the handheld input device 100 or may manipulate the above described virtual objects on other virtual objects using the handheld input device 100, for example, using a touch input on the touch sensitive surface 125 or based on performing a tapping action with the handheld input device 100, among others.

In other embodiments, for example, the virtual object interaction system 500 may interface with a camera tracking system 300 to track other objects besides a user's hand 110 or fingers 115 through the transparent planar portion 120 of the handheld input device 100. In examples, a touch sensitive surface 125 of the handheld input device may be used in an XR environment to provide controls for interacting with tracked objects, for example, to change the visual properties of tracked objects, among others.

Various embodiments of the present disclosure having been thus described in detail by way of example, it will be apparent to those skilled in the art that variations and modifications may be made without departing from the disclosure. The disclosure includes all such variations and modifications as fall within the scope of the appended claims.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable an electronic device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A handheld input device for interacting with one or more virtual objects in an extended reality (XR) environment, the handheld input device comprising:
   a transparent planar portion having a touch sensitive surface including a touch sensor configured to detect a touch input from a user holding the handheld input device such that at least a portion of a hand of the user is visible to a camera tracking system through the transparent planar portion;
   one or more processor devices; and
   one or more memories storing machine-executable instructions, which when executed by the one or more processor devices, cause the handheld input device to:
      obtain touch information corresponding to a detected touch input; and
      communicate the touch information to a computing system configured to control interactions with the one or more virtual objects within the XR environment based on the touch information and a tracked position of the hand of the user visible to the camera tracking system.

2. The handheld input device of claim 1, further comprising:
   an actuator coupled to the handheld input device, the actuator for generating a haptic feedback to the user holding the handheld input device.

3. The handheld input device of claim 1, further comprising:
   a handle for holding the input device, wherein the one or more processor devices and the one or more memories are disposed within the handle.

4. The handheld input device of claim 3, further comprising:
   a power source, wherein the power source is disposed within the handle.

5. The handheld input device of claim 3, further comprising:
   a motion sensor disposed within the handle, the motion sensor for detecting a position and an orientation of the handheld input device, wherein the one or more processor devices is further configured to execute the machine-executable instructions to cause the handheld input device to:
      obtain motion information corresponding to the position and the orientation of the handheld input device; and
      communicate the motion information to the computing system configured to control interactions with the virtual object within the XR environment.

6. The handheld input device of claim 1, wherein the computing system is disposed within a head mounted device.

7. The handheld input device of claim 3, further comprising:
   a rigid frame coupled to the handle and bounding the touch sensitive surface; wherein the touch sensitive surface is configured as a transparent window within the frame.

8. The handheld input device of claim 7, further comprising:
   one or more markers coupled to the frame for tracking the frame with an external camera tracking system.

9. The handheld input device of claim 1, wherein the touch sensitive surface includes a first touch sensitive surface on a first side of the planar portion and a second touch sensitive surface on a second side of the planar portion.

10. A computer implemented method for interacting with a virtual object in an XR environment using a handheld input device, the method comprising:
    receiving, from an external camera tracking system, camera tracking information indicating a position of a user's hand that is holding the handheld input device and at least partially visible to the camera tracking system through a transparent planar portion of the handheld input device;
    estimating a position and an orientation of the handheld input device based on the camera tracking information;
    receiving touch information corresponding to a detected touch input on a touch sensitive surface of the handheld input device;
    sending the position and the orientation of the handheld input device and the touch information to a computing system configured to control interactions with the virtual object within the XR environment, the position of the handheld input device corresponding to a position of a virtual tablet device in the XR environment; and
    controlling, by the computing system, interactions with the virtual object within the XR environment based on the position and the orientation of the handheld input device and the touch information.

11. The computer implemented method of claim 10, wherein the camera tracking information includes a tracked position of one or more hand landmarks of the user's hand and estimating the position and the orientation of the handheld input device based on the camera tracking information comprises:
    estimating the position and the orientation of the handheld input device based on the position of the one or more hand landmarks.

12. The computer implemented method of claim 11, wherein at least one of the one or more hand landmarks is visible through the transparent planar portion of the handheld input device.

13. The computer implemented method of claim 10, wherein the camera tracking information includes a tracked position of one or more markers coupled to the handheld input device and estimating the position and the orientation of the handheld input device comprises:
    estimating the position and the orientation of the handheld input device based on the tracked position of the one or more markers.

14. The computer implemented method of claim 10, wherein the virtual object is a 2D virtual object, the method further comprising:
    prior to receiving the touch information:
        detecting a virtual collision between the virtual tablet device and a 3D virtual object in the XR environment, the 3D virtual object serving as a container for the 2D virtual object; and displaying the 2D virtual object in the XR environment, the 2D virtual object being positioned in the XR environment to overlay the virtual tablet device with effect that interaction, by the user, with the 2D object in the XR environment causes a touch input to be detected on the touch sensitive surface.

15. The computer implemented method of claim 10, wherein the virtual object is a 3D virtual object, the method further comprising:
  prior to receiving the touch information:
    detecting a virtual collision between the virtual tablet device and the 3D virtual object in the XR environment, wherein the virtual collision is associated with a tapping action of the handheld input device on a physical object, the tapping action performed by the user holding the handheld input device, the tapping action generating a haptic feedback to the user, the virtual collision serving to select the 3D virtual object for interaction within the XR environment.

16. The computer implemented method of claim 10, further comprising:
  generating, using an actuator coupled to the handheld input device, a vibrotactile feedback.

17. The computer implemented method of claim 10, further comprising:
  receiving motion information corresponding to motion of the handheld input device; and
  estimating the position and the orientation of the handheld input device based on the camera tracking information and the motion information.

18. The computer implemented method of claim 17, wherein estimating the position and the orientation of the handheld input device based on the camera tracking information and the motion information comprises:
  fusing the camera tracking information and the motion information to generate a fused information; and
  estimating the position and the orientation of the handheld input device based on the fused information.

19. The method of claim 10, wherein receiving touch information corresponding to the detected touch input on the touch sensitive surface of the handheld input device is responsive to detecting a virtual collision in the XR environment between the virtual tablet device and the virtual object.

20. A non-transitory computer-readable medium having machine-executable instructions stored thereon which, when executed by one or more processors of a computing system, cause the computing system to:
  receive, from an external camera tracking system, camera tracking information indicating a position of a user's hand that is holding the handheld input device and at least partially visible to the camera tracking system through a transparent planar portion of the handheld input device;
  estimate a position and an orientation of the handheld input device based on the camera tracking information;
  receive touch information corresponding to a detected touch input on a touch sensitive surface of the handheld input device;
  send the position of the handheld input device and the touch information to a computing system configured to control interactions with the virtual object within an XR environment, the position and the orientation of the handheld input device corresponding to a position and an orientation of a virtual tablet device in the XR environment; and
  control, by the computing system, interactions with the virtual object within the XR environment based on the position and the orientation of the handheld input device and the touch information.

\* \* \* \* \*